United States Patent
Shibata et al.

(10) Patent No.: US 10,581,311 B2
(45) Date of Patent: Mar. 3, 2020

(54) POWER CONVERSION DEVICE INCLUDING OVERCURRENT DETECTION WITH REDUCED DELAY

(71) Applicant: TOSHIBA MITSUBISHI-ELECTRIC INDUSTRIAL SYSTEMS CORPORATION, Chuo-ku (JP)

(72) Inventors: Naoya Shibata, Tokyo (JP); Masahiro Kinoshita, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/330,835

(22) PCT Filed: Dec. 2, 2016

(86) PCT No.: PCT/JP2016/085936
§ 371 (c)(1),
(2) Date: Mar. 6, 2019

(87) PCT Pub. No.: WO2018/100736
PCT Pub. Date: Jun. 7, 2018

(65) Prior Publication Data
US 2019/0214897 A1 Jul. 11, 2019

(51) Int. Cl.
*H02H 7/122* (2006.01)
*H02M 1/00* (2006.01)
(Continued)

(52) U.S. Cl.
CPC ............. *H02M 1/00* (2013.01); *H02M 1/32* (2013.01); *H02M 7/48* (2013.01);
(Continued)

(58) Field of Classification Search
CPC ........ H02H 3/34; H02H 3/083; H02H 7/1227; H02H 3/08; H02H 3/105; H02M 1/32
See application file for complete search history.

(56) References Cited

U.S. PATENT DOCUMENTS

| | | | | |
|---|---|---|---|---|
| 5,831,807 A | * | 11/1998 | Masannek | H02H 7/1227 361/93.2 |
| 2004/0051383 A1 | * | 3/2004 | Clark, Jr. | H02J 1/10 307/36 |
| 2014/0003103 A1 | * | 1/2014 | Aaltio | H02M 1/32 363/56.03 |

FOREIGN PATENT DOCUMENTS

JP 8-84371 A 3/1996

OTHER PUBLICATIONS

English translation of International Preliminary Report on Patentability and Written Opinion dated Jun. 13, 2019 in PCT/JP2016/085936, 6 pages.
(Continued)

*Primary Examiner* — Harry R Behm
(74) *Attorney, Agent, or Firm* — Oblon, McClelland, Maier & Neustadt, L.L.P.

(57) ABSTRACT

A control device for a power conversion device that is capable of detecting current abnormality of the power conversion device with no delay is provided. The control device for the power conversion device includes a current detection unit for outputting an error signal when a detection value of a current sensor for detecting current flowing through the power conversion device is larger than a preset overcurrent determination value, and outputting a state detection value larger than a value corresponding to the error signal based on the error signal, and an abnormality detection unit for accepting an input of the state detection value of the current detection unit via the wiring, and an abnormality detection unit for outputting an error signal when the state detection
(Continued)

value of the current detection unit is larger than a preset overcurrent abnormality determination value, and detecting abnormality based on the error signal.

5 Claims, 7 Drawing Sheets

(51) Int. Cl.
*H02M 7/5387* (2007.01)
*H02M 7/48* (2007.01)
*H02M 1/32* (2007.01)
*H02J 3/38* (2006.01)

(52) U.S. Cl.
CPC ... *H02M 7/53871* (2013.01); *H02M 7/53875* (2013.01); *H02H 7/1227* (2013.01); *H02J 3/383* (2013.01); *H02M 2001/0009* (2013.01)

(56) References Cited

OTHER PUBLICATIONS

International Search Report dated Jan. 10, 2017 in PCT/JP2016/085936 filed on Dec. 2, 2016.

* cited by examiner

POWER CONVERSION DEVICE INCLUDING OVERCURRENT DETECTION WITH REDUCED DELAY

FIELD

The present invention relates to a control device for a power conversion device.

BACKGROUND

Patent Literature 1 discloses a control device for a power conversion device. For example, the control device includes a current detection unit and an abnormality detection unit. For example, the current detection unit outputs an error signal via a wiring when detecting current abnormality such as an overcurrent of the power conversion device. For example, the abnormality detection unit detects the current abnormality based on the error signal.

CITATION LIST

Patent Literature

[PTL 1] JP H08-84371 A

SUMMARY

Technical Problem

At this time, the abnormality detection unit executes filter processing on the error signal to suppress malfunction caused by noise. For this reason, detection of current abnormality in the power conversion device is delayed.

The present invention has been made to solve the above-mentioned problem. An object of the present invention is to provide a control device for a power conversion device that is capable of detecting current abnormality of a power conversion device with no delay.

Solution to Problem

A control device for a power conversion device according to the present invention comprises: a current detection unit configured to output an error signal when a detection value of a current sensor configured to detect current flowing in the power conversion device is larger than a preset overcurrent determination value, and output a state detection value larger than a value corresponding to the error signal based on the error signal; and an abnormality detection unit configured to accept an input of the state detection value of the current detection unit via a wiring, output an error signal when the state detection value of the current detection unit is larger than a preset overcurrent abnormality determination value, and detect abnormality based on the error signal.

A control device for a power conversion device according to the present invention comprises: a current detection unit configured to output an error signal when a deviation between a detection value of a first current sensor configured to detect first current flowing through a first portion of the power conversion device and a detection value of a second current sensor configured to detect second current flowing through a second portion of the power conversion device is larger than a preset deviation determination value, and output a state detection value larger than a value corresponding to the error signal based on the error signal; and an abnormality detection unit configured to accept an input of the state detection value of the current detection unit via a wiring, output an error signal when the state detection value of the current detection unit is larger than a preset deviation abnormality determination value, and detect abnormality based on the error signal.

Advantageous Effects of Invention

According to these inventions, the current detection unit outputs the state detection value larger than the value corresponding to the error signal to the abnormality detection unit. The abnormality detection unit detects abnormality without performing filtering processing. Therefore, current abnormality of the power conversion device can be detected with no delay.

DESCRIPTION OF EMBODIMENTS

Figure 1:
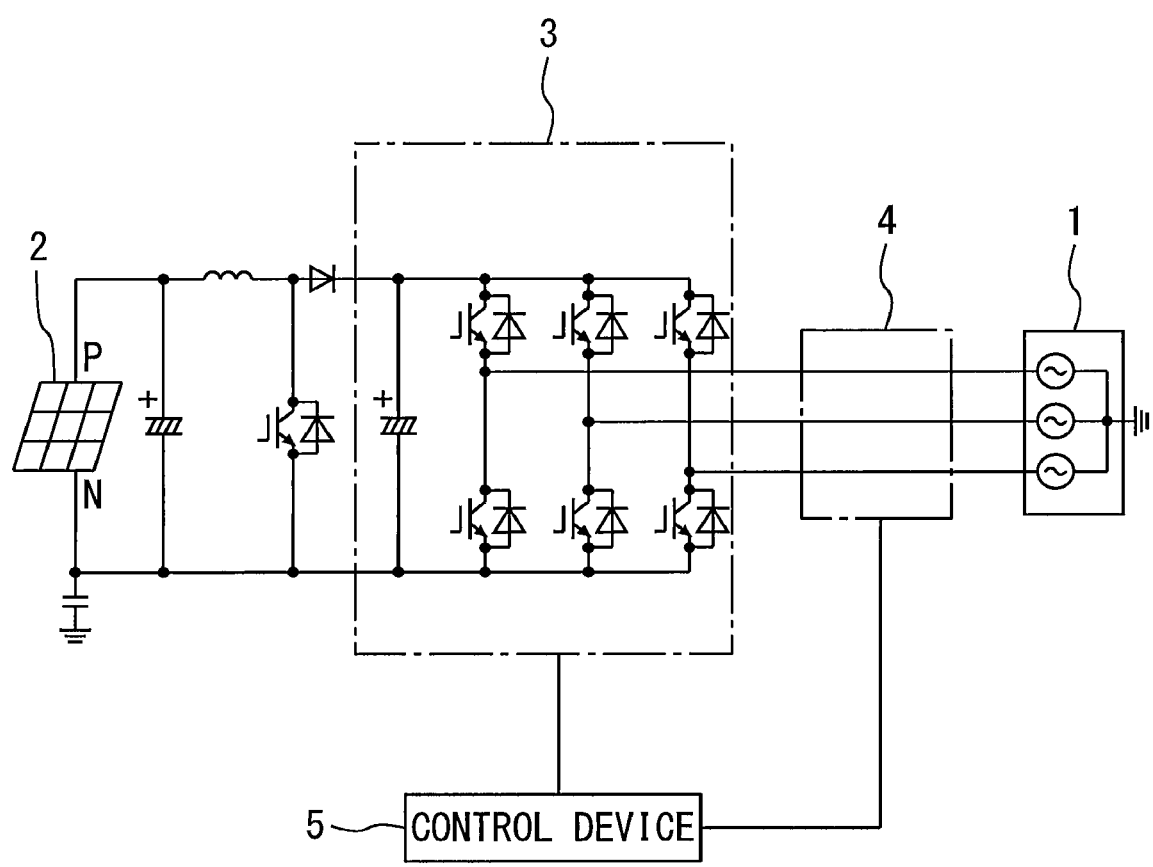
FIG. 1 is a configuration diagram of a power supply system to which a control device for a power conversion device according to a first embodiment of the present invention is applied.

Embodiments of the present invention will be described with reference to the accompanying drawings. In the drawings, the same or corresponding portions are represented by the same reference signs. Duplicative description on the portions will be appropriately simplified or omitted.

First Embodiment

FIG. 1 is a configuration diagram of a power supply system to which a control device for a power conversion device according to a first embodiment of the present invention is applied.

In FIG. 1, the power supply system includes a power system 1, a solar cell module 2, a power conversion device 3, a current sensor 4, and a control device 5.

The power system 1 is provided outdoors. The solar cell module 2 is provided outdoors. The power conversion device 3 is provided outdoors. The power conversion device 3 is electrically connected between the power system 1 and the solar cell module 2.

The current sensor 4 is provided between the power system 1 and the power conversion device 3. An input portion of the control device 5 is connected to an output portion of the current sensor 4. An output portion of the control device 5 is connected to an input portion of the power conversion device 3.

For example, the power system 1 is operated by an electric power company. The solar cell module 2 converts light energy of the sun into DC power. The power conversion device 3 receives DC power from the solar cell module 2. The power conversion device 3 converts the DC power into AC power. For example, the power conversion device 3 converts the DC power into three-phase AC power. The power conversion device 3 supplies the AC power to the power system 1.

The current sensor 4 detects current flowing in the power conversion device 3. For example, the current sensor 4 detects output current of at least one phase of the power conversion device 3. The control device 5 controls the operation of the power conversion device 3 based on a detection value of the current sensor 4.

Next, an outline of the control device 5 will be described with reference to FIG. 2.

Figure 2:
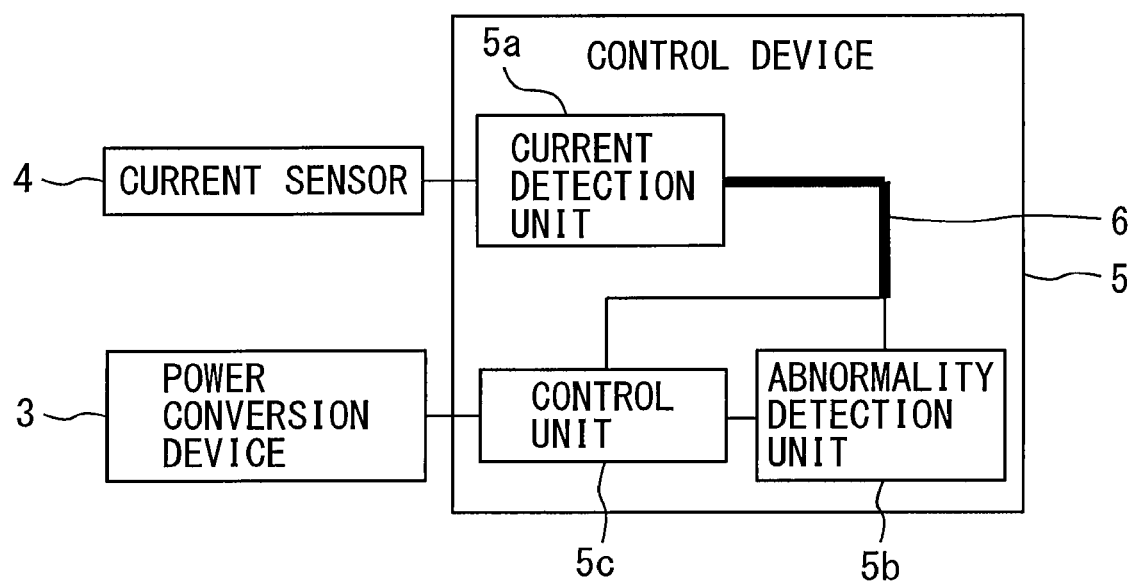
FIG. 2 is a block diagram of the control device for the power conversion device according to the first embodiment of the present invention.

FIG. 2 is a block diagram of the control device for the power conversion device according to the first embodiment of the present invention.

As shown in FIG. 2, the control device 5 includes a current detection unit 5a, an abnormality detection unit 5b, and a control unit 5c.

The current detection unit 5a outputs an error signal when the detection value of the current sensor 4 is larger than a preset overcurrent determination value. The current detection unit 5a outputs a state detection value larger than the value corresponding to the error signal based on the error signal.

The abnormality detection unit 5b accepts an input of the state detection value of the current detection unit 5a via a wiring 6. The abnormality detection unit 5b outputs an error signal when the state detection value of the current detection unit 5a is larger than a preset overcurrent abnormality determination value. The abnormality detection unit 5b detects abnormality based on the error signal.

The control unit 5c accepts an input of the detection value of the current sensor 4 via the current detection unit 5a and the wiring 6. The control unit 5c accepts an input of the error signal from the abnormality detection unit 5b. The control unit 5c controls the operation of the power conversion device 3 based on the detection value of the current sensor 4 from the current detection unit 5a and the error signal from the abnormality detection unit 5b.

Next, the current detection unit 5a and the abnormality detection unit 5b will be described with reference to FIG. 3.

Figure 3:
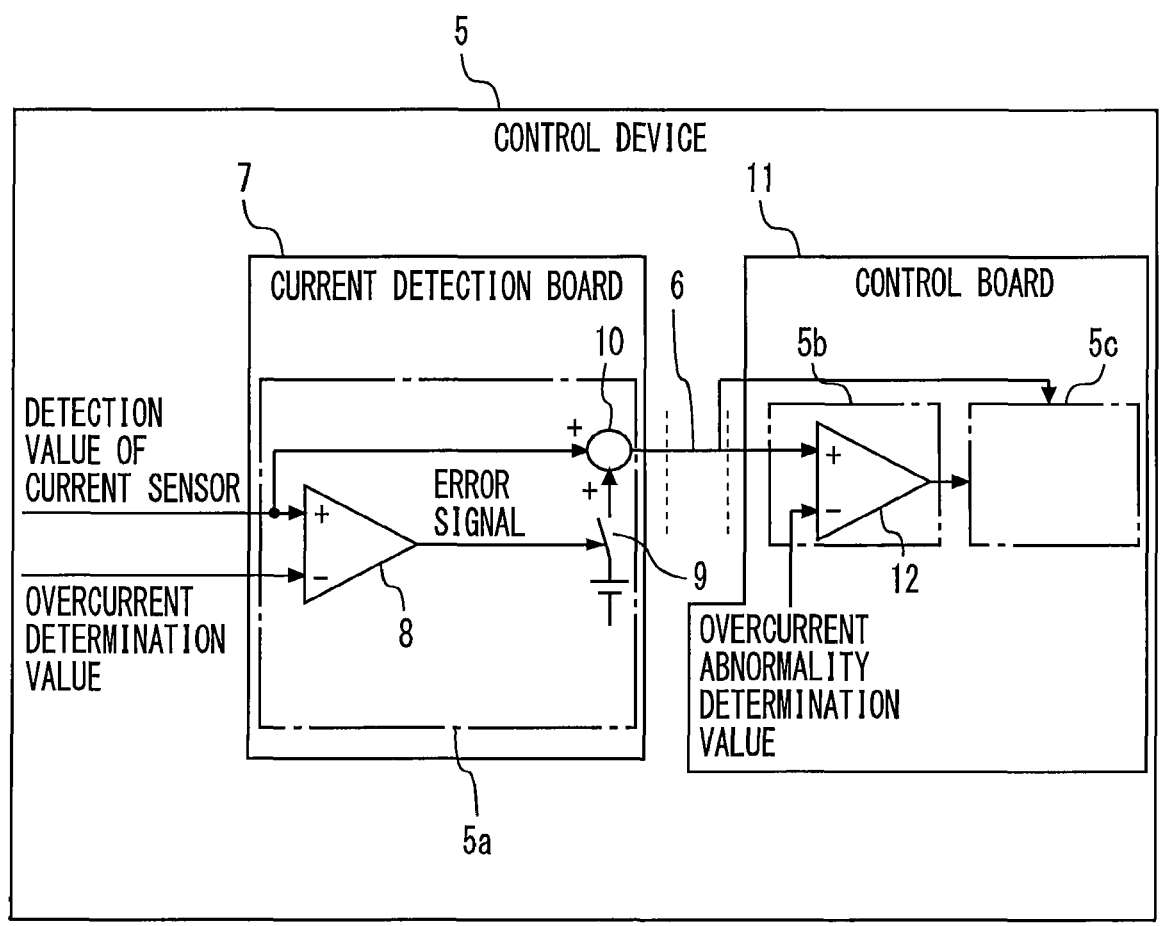
FIG. 3 is a diagram showing a current detection unit and an abnormality detection unit of the control device for the power conversion device according to the first embodiment of the present invention.

FIG. 3 is a diagram showing the current detection unit and the abnormality detection unit of the control device for the power conversion device according to the first embodiment of the present invention.

As shown in FIG. 3, the current detection unit 5a is provided on a current detection board 7. The current detection unit 5a includes an overcurrent comparator 8, a switch 9, and an adder 10.

The overcurrent comparator 8 compares the detection value of the current sensor 4 with the overcurrent determination value. When the detection value of the current sensor 4 is larger than the overcurrent determination value, the overcurrent comparator 8 outputs an error signal. For example, the overcurrent comparator 8 outputs a high-level signal. When the detection value of the current sensor 4 is equal to or less than the overcurrent determination value, the overcurrent comparator 8 does not output any error signal. For example, the overcurrent comparator 8 outputs a low-level signal.

The switch 9 operates based on the error signal from the overcurrent comparator 8. For example, the switch 9 is closed based on the error signal from the overcurrent comparator 8.

The adder 10 adds the detection value of the current sensor 4 and the value from the switch 9. The adder 10 outputs a state detection value obtained by adding the detection value of the current sensor 4 and the value from the switch 9. At this time, the state detection value is set to a value larger than the value corresponding to the error signal of the overcurrent comparator 8.

The abnormality detection unit 5b is provided on a control board 11. The abnormality detection unit 5b has an abnormality detection comparator 12.

The abnormality detection comparator 12 accepts an input of the state detection value from the adder 10. The abnormality detection comparator 12 compares the state detection value with the overcurrent abnormality determination value. When the state detection value is larger than the overcurrent abnormality determination value, the abnormality detection comparator 12 outputs an error signal. For example, the abnormality detection comparator 12 outputs a high-level signal. When the state detection value is equal to or less than the overcurrent abnormality determination value, the abnormality detection comparator 12 does not output any error signal. For example, the abnormality detection comparator 12 outputs a low-level signal.

Next, an outline of the operation of the control device 5 will be described with reference to FIG. 4.

Figure 4:
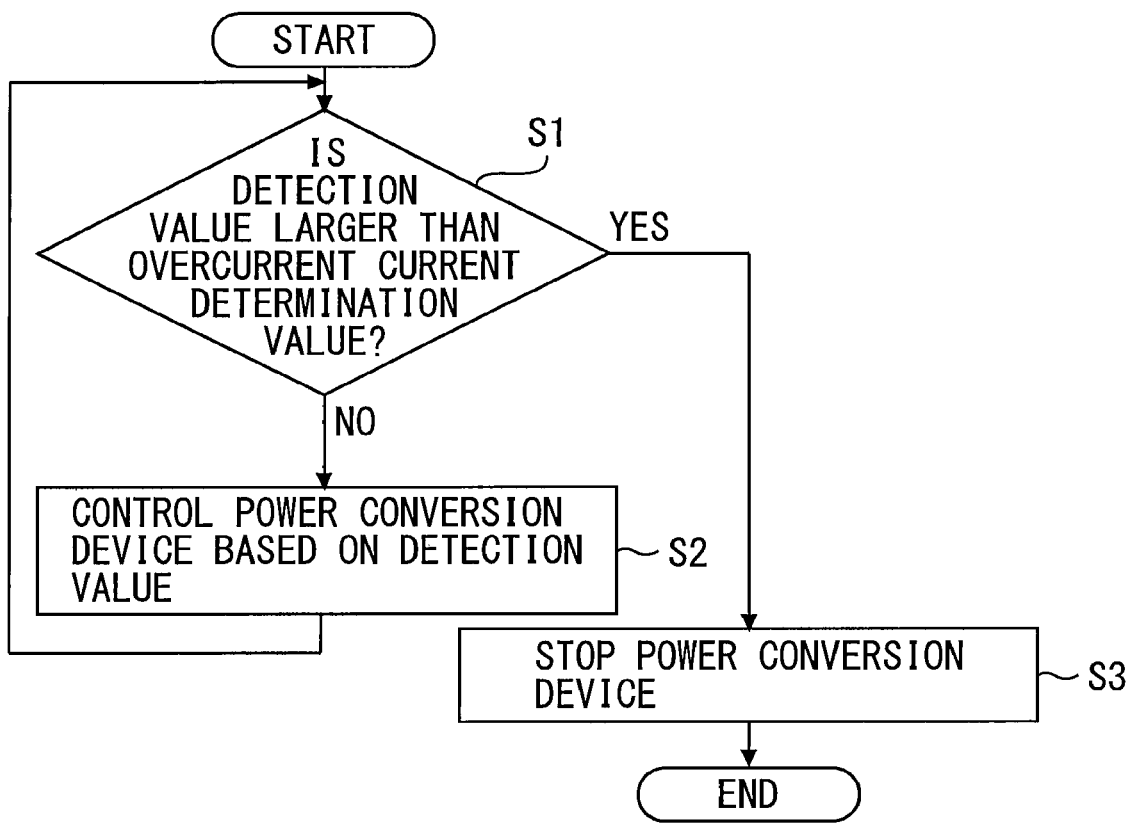
FIG. 4 is a flowchart showing an operation of the control device for the power conversion device according to the first embodiment of the present invention.

FIG. 4 is a flowchart showing the operation of the control device for the power conversion device according to the first embodiment of the present invention.

In step S1, the control device 5 determines whether the detection value of the current sensor 4 is larger than the overcurrent determination value.

When the detection value of the current sensor 4 is equal to or less than the overcurrent determination value in step S1, the control device 5 performs the operation of step S2. In step S2, the control device 5 controls the operation of the power conversion device 3 based on the detection value of the current sensor 4. Thereafter, the control device 5 performs the operation of step S1.

When the detection value of the current sensor 4 is larger than the overcurrent determination value in step S1, the control device 5 performs the operation of step S3. In step S3, the control device 5 stops the power conversion device 3. Thereafter, the control device 5 finishes the operation.

According to the first embodiment described above, the current detection unit 5a outputs the state detection value larger than the value corresponding to the error signal to the abnormality detection unit 5b. The abnormality detecting unit 5b detects overcurrent abnormality without performing filtering processing having a large time delay. Therefore, it is possible to detect the current abnormality of the power conversion device 3 with no delay.

As a result, it is possible to suppress expansion of a failure range of the power conversion device 3. Therefore, it is possible to suppress expansion of a range to be repaired under a failure of the power conversion device 3. Furthermore, it is possible to suppress increase of a repairing time under a failure of the power conversion device 3. Still furthermore, it is unnecessary to narrow a normal operation range of the power conversion device 3 in consideration of delay in current abnormality of the power conversion device 3.

Furthermore, the current detection unit 5a can be realized by the overcurrent comparator 8, the switch 9, and the adder 10. The abnormality detection unit 5b can be realized by the abnormality detection comparator 12. Therefore, it is possible to detect overcurrent abnormality of the power conversion device 3 with no delay by a simple configuration.

The abnormality detection unit 5b accepts an input of the state detection value via the wiring 6. The control unit 5c accepts an input of the detection value of the current sensor 4 via the wiring 6. Therefore, the number of wirings 6 between the current detection board 7 and the control board 11 can be reduced.

Next, an example of the control device 5 will be described.

Figure 5:
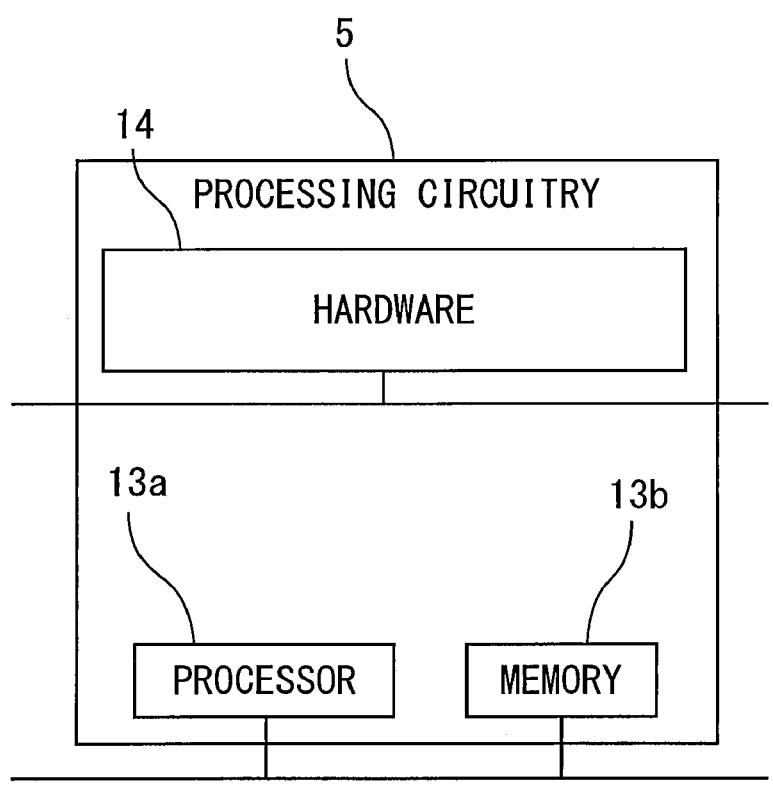
FIG. 5 is a hardware configuration diagram of the control device for the power conversion device according to the first embodiment of the present invention.

FIG. 5 is a hardware configuration diagram of the control device for the power conversion device according to the first embodiment of the present invention.

Each function of the control device 5 can be realized by processing circuitry. For example, the processing circuitry includes at least one processor 13a and at least one memory 13b. For example, the processing circuitry includes at least one dedicated hardware 14.

When the processing circuitry includes at least one processor 13a and at least one memory 13b, each function of the control device 5 is realized by software, firmware, or a combination of software and firmware. At least one of software and firmware is described as a program. At least one of software and firmware is stored in at least one memory 13b. At least one processor 13a realizes each function of the control device 5 by reading out and executing a program stored in at least one memory 13b. The at least one processor 13a is also referred to as a CPU (Central Processing Unit), a central processing unit, a processing unit, an arithmetic unit, a microprocessor, a microcomputer, or a DSP. For example, the at least one memory 13b is a nonvolatile or volatile semiconductor memory such as RAM, ROM, flash memory, EPROM, or EEPROM, a magnetic disk, a flexible disk, an optical disk, a compact disk, a mini disk, DVD, or the like.

When the processing circuitry includes at least one dedicated hardware 14, the processing circuitry is realized, for example, by a single circuit, a composite circuit, a programmed processor, a parallel programmed processor, ASIC, FPGA, or a combination thereof. For example, each function of the control device 5 is realized by processing circuitry. For example, the respective functions of the control device 5 are collectively realized by processing circuitry.

A part of the respective functions of the control device 5 may be realized by dedicated hardware 14 and the other part thereof may be realized by software or firmware. For example, the function of the current detection unit 5a may be realized by processing circuitry as dedicated hardware 14, and the functions other than that of the current detection unit 5a may be realized by at least one processor 13a reading out and executing programs stored in at least one memory 13b.

In this way, the processing circuitry realizes the respective functions of the control device 5 with hardware 14, software, firmware, or a combination thereof.

Second Embodiment

Figure 6:
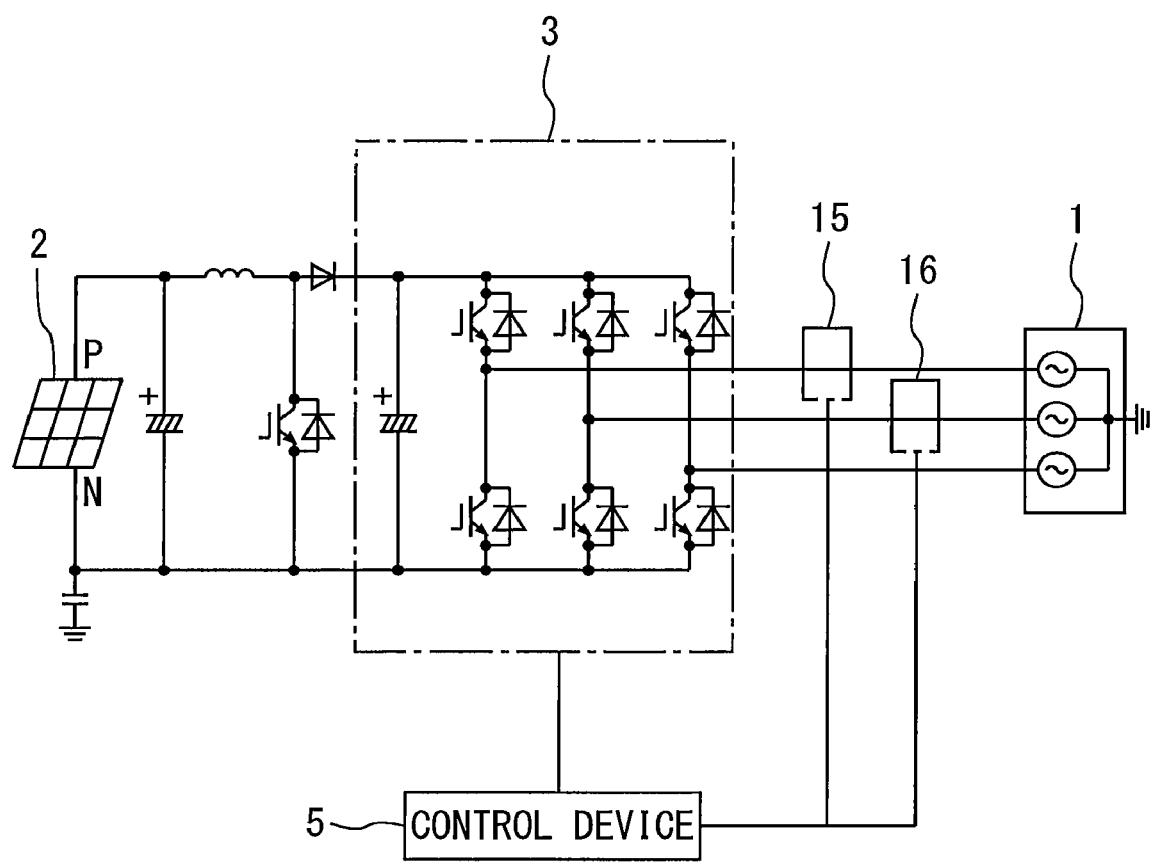
FIG. 6 is a configuration diagram of a power supply system to which a control device for a power conversion device according to a second embodiment of the present invention is applied.

FIG. 6 is a configuration diagram of a power supply system to which a control device for a power conversion device according to a second embodiment of the present invention is applied. Note that the same or corresponding portions as the first embodiment are represented by the same reference signs. Description on the portions will be omitted.

As shown in FIG. 6, a first current sensor 15 is provided between a power system 1 and a power conversion device 3. The first current sensor 15 corresponds to a first portion of the power conversion device 3. For example, the first current sensor 15 is provided to a first phase of the power conversion device 3. A second current sensor 16 is provided between the power system 1 and the power conversion device 3. The second current sensor 16 corresponds to a second portion of the power conversion device 3. For example, the second current sensor 16 is provided to a second phase of the power conversion device 3.

The first current sensor 15 detects first current flowing through the first portion of the power conversion device 3. For example, the first current sensor 15 detects output current of the first phase of the power conversion device 3. The second current sensor 16 detects second current flowing through the second portion of the power conversion device 3. For example, the second current sensor 16 detects output current of a second phase of the power conversion device 3. The control device 5 controls the operation of the power conversion device 3 based on the average value of the detection value of the first current sensor 15 and the detection value of the second current sensor 16.

Next, the current detection unit 5a and the abnormality detection unit 5b will be described with reference to FIG. 7.

Figure 7:
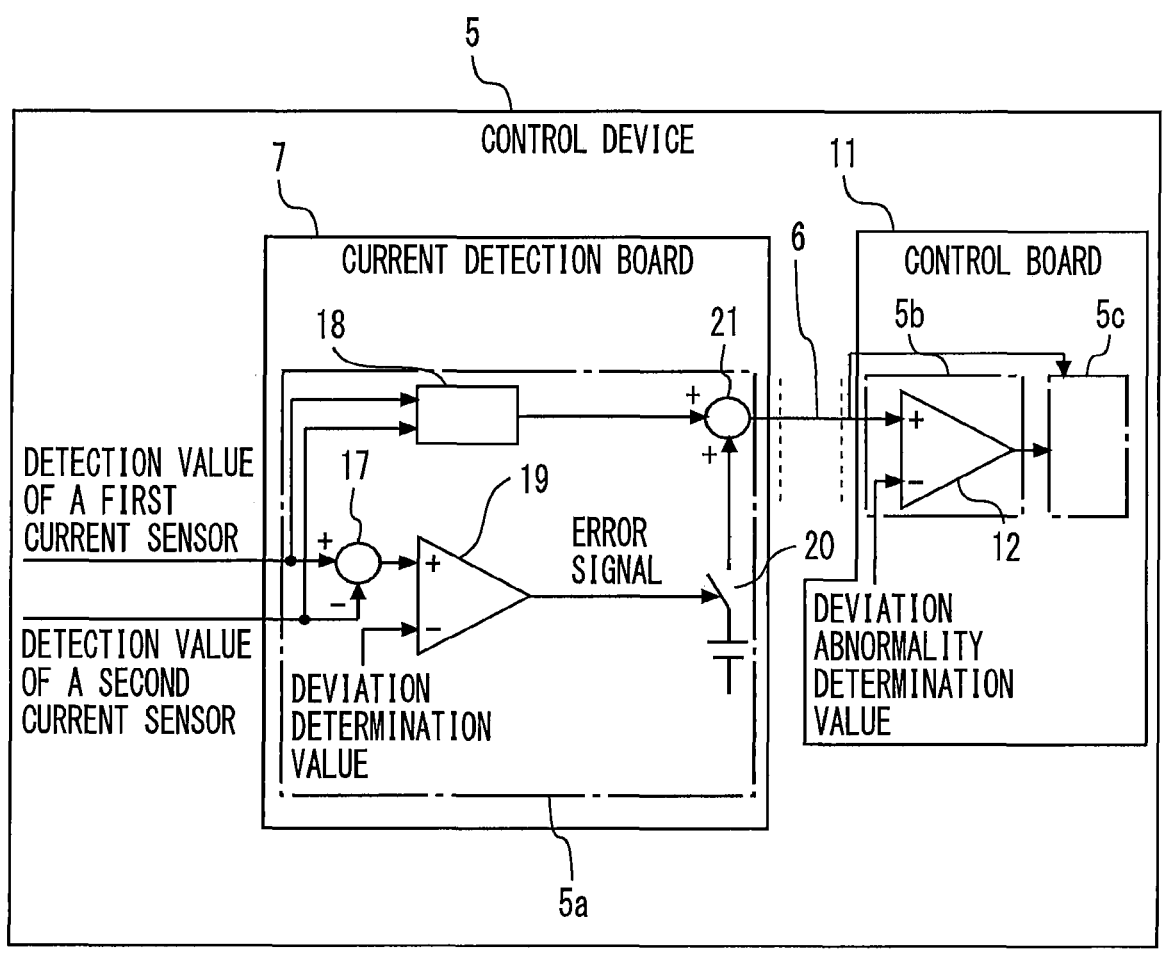
FIG. 7 is a diagram showing a current detection unit and an abnormality detection unit of the control device for the power conversion device in the second embodiment of the present invention.

FIG. 7 is a diagram showing the current detection unit and the abnormality detection unit of the control device for the power conversion device according to the second embodiment of the present invention.

As shown in FIG. 7, the current detection unit 5a is provided on a current detection board 7. The current detection unit 5a includes a subtracter 17, an average value calculator 18, a deviation comparator 19, a switch 20, and an adder 21.

The subtracter 17 calculates a deviation between the detection value of the first current sensor 15 and the detection value of the second current sensor 16.

The average value calculator 18 calculates an average value between the detection value of the first current sensor 15 and the detection value of the second current sensor 16.

The deviation comparator 19 compares the deviation between the detection value of the first current sensor 15 and the detection value of the second current sensor 16 with a deviation determination value. When the deviation between the detection value of the first current sensor 15 and the detection value of the second current sensor 16 is larger than the deviation determination value, the deviation comparator 19 outputs an error signal. For example, the deviation comparator 19 outputs a high-level signal. When the deviation between the detection value of the first current sensor 15 and the detection value of the second current sensor 16 is equal to or less than the deviation determination value, the deviation comparator 19 does not output any error signal. For example, the deviation comparator 19 outputs a low-level signal.

The switch 20 operates based on the error signal from the deviation comparator 19. For example, the switch 20 is closed by the error signal from the deviation comparator 19.

The adder 21 adds a value from the average value calculator 18 and a value from the switch 20. The adder 21 outputs a state detection value obtained by adding the value from the average value calculator 18 and the value from the switch 20. At this time, the state detection value is set to a value larger than the value corresponding to the error signal of the deviation comparator 19.

The abnormality detection unit 5b is provided on the control board 11. The abnormality detection section 5b has an abnormality detection comparator 12.

The abnormality detection comparator 12 accepts an input of the state detection value from the adder 21. The abnormality detection comparator 12 compares the state detection value with the deviation abnormality determination value. When the state detection value is larger than the deviation abnormality determination value, the abnormality detection comparator 12 outputs an error signal. For example, the abnormality detection comparator 12 outputs a high-level signal. When the state detection value is equal to or less than the deviation abnormality determination value, the abnormality detection comparator 12 does not output any error signal. For example, the abnormality detection comparator 12 outputs a low-level signal.

According to the above-described second embodiment, the current detection unit 5a outputs the state detection value larger than the value corresponding to the error signal to the abnormality detection unit 5b. The abnormality detection unit 5b detects the current deviation abnormality without performing filtering processing having a large time delay. Therefore, it is possible to detect the current abnormality of the power conversion device 3 with no delay.

Furthermore, the current detection unit 5a can be realized by the subtracter 17, the average value calculator 18, the deviation comparator 19, the switch 20, and the adder 21. The abnormality detection unit 5b can be realized by the abnormality detection comparator 12. For this reason, it is possible to detect the current deviation abnormality of the power conversion device 3 with no delay by a simple configuration.

Furthermore, the abnormality detection unit 5b accepts an input of the state detection value via the wiring 6. The control unit 5c accepts an input of an average value between the detection value of the first current sensor 15 and the detection value of the second current sensor 16 via the wiring 6. Therefore, the number of wirings 6 between the current detection board 7 and the control board 11 can be reduced.

INDUSTRIAL APPLICABILITY

As described above, the control device 5 of the power conversion device 3 according to the present invention can be used in a system for detecting current abnormality of the power conversion device 3 with no delay.

REFERENCE SIGNS LIST

1 power system, 2 solar cell module, 3 power conversion device, 4 current sensor, 5 control device, 5a current detection unit, 5b abnormality detection unit, 5c control unit, 6 wiring, 7 current detection board, 8 overcurrent comparator, 9 switch, 10 adder, 11 control board, 12 abnormality detection comparator, 13a processor, 13b memory, 14 hardware, 15 first current sensor, 16 second current sensor, 17 subtracter, 18 average value calculator, 19 deviation comparator, 20 switch, 21 adder

The invention claimed is:

1. A control device for a power conversion device comprising:
   a current detection unit configured to output a first error signal when a detection value of a current sensor configured to detect current flowing in the power conversion device is larger than a preset overcurrent determination value, and output a state detection value larger than a value corresponding to the first error signal based on the first error signal; and
   an abnormality detection unit configured to accept an input of the state detection value of the current detection unit via a wiring, output a second error signal when the state detection value of the current detection unit is larger than a preset overcurrent abnormality determination value, and detect abnormality based on the second error signal,
   wherein the current detection unit includes an overcurrent comparator and a switch, the overcurrent comparator is configured to output the first error signal when the detection value of the current sensor is larger than the overcurrent determination value, the current detection unit is configured to output the state detection value larger than the value corresponding to the first error signal based on an operation of the switch caused by the first error signal,
   wherein the abnormality detection unit includes an abnormality detection comparator, the abnormality detection comparator is configured to output the second error signal when the state detection value of the current detection unit is larger than the overcurrent abnormality determination value, and the abnormality detection unit is configured to detect abnormality based on the second error signal.

2. The control device for a power conversion device according to claim 1, further comprising a control unit configured to accept an input of the detection value of the current sensor via the wiring, and control the power conversion device based on the detection value of the current sensor,
   wherein the overcurrent comparator is configured to output the first error signal when the detection value of the current sensor is lamer than the overcurrent determination value, and the current detection unit is configured to output the state detection value larger than the value corresponding to the first error signal to the wiring by adding a preset value to the detection value of the current sensor based on an operation of the switch caused by the first error signal.

3. A control device for a power conversion device comprising:
   a current detection unit configured to output a first error signal when a deviation between a detection value of a first current sensor configured to detect a first current flowing through a first portion of the power conversion device and a detection value of a second current sensor configured to detect a second current flowing through a second portion of the power conversion device is larger than a preset deviation determination value, and output a state detection value larger than a value corresponding to the first error signal based on the first error signal; and
   an abnormality detection unit configured to accept an input of the state detection value of the current detection unit via a wiring, output a second error signal when the state detection value of the current detection unit is larger than a preset deviation abnormality determination value, and detect abnormality based on the second error signal.

4. The control device for a power conversion device according to claim 3, wherein the current detection unit includes a deviation comparator and a switch, the deviation comparator is configured to output the first error signal when the deviation between the detection value of the first current sensor and the detection value of the second current sensor is larger than the deviation determination value, the current detection unit is configured to output the state detection value larger than the value corresponding to the first error signal based on an operation of the switch caused by the first error signal, wherein the abnormality detection unit includes an abnormality detection comparator, the abnormality detection comparator outputs the second error signal when the state detection value of the current detection unit is larger than the deviation abnormality determination value, and the abnormality detection unit detects abnormality based on the second error signal.

5. The control for a power conversion device according to claim 4, further comprising a control unit for accepting an input of an average value between the detection value of the first current sensor and the detection value of the second current sensor via the wiring, and controlling the power conversion device based on the average value between the detection value of the first current sensor and the detection value of the second current sensor, wherein the deviation comparator is configured to output the first error signal when the deviation between the detection value of the first current sensor and the detection value of the second current sensor is larger than the deviation determination value, and the current detection unit is configured to output the state detection value larger than the value corresponding to the first error signal to the wiring by adding a preset value to the average value between the detection value of the first current sensor and the detection value of the second current sensor based on an operation of the switch caused by the first error signal.

* * * * *